(12) United States Patent
Avlas et al.

(10) Patent No.: US 12,306,299 B2
(45) Date of Patent: May 20, 2025

(54) LIDAR LASER HEALTH DIAGNOSTIC

(71) Applicant: GM GLOBAL TECHNOLOGY OPERATIONS LLC, Detroit, MI (US)

(72) Inventors: Leon N. Avlas, Los Gatos, CA (US); Nathaniel W. Hart, Beverly Hills, MI (US); Adam L. Wright, Livonia, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1127 days.

(21) Appl. No.: 17/155,217

(22) Filed: Jan. 22, 2021

(65) Prior Publication Data

US 2022/0236410 A1 Jul. 28, 2022

(51) Int. Cl.
*G01S 17/02* (2020.01)
*G01S 7/499* (2006.01)
*G01S 17/931* (2020.01)

(52) U.S. Cl.
CPC .............. *G01S 17/02* (2013.01); *G01S 7/499* (2013.01); *G01S 17/931* (2020.01)

(58) Field of Classification Search
None
See application file for complete search history.

(56) References Cited

U.S. PATENT DOCUMENTS

| 10,727,601 | B1* | 7/2020 | Akselrod | H01Q 15/0053 |
| 2015/0178998 | A1* | 6/2015 | Attard | G07C 5/008 |
| | | | | 701/23 |
| 2019/0212416 | A1* | 7/2019 | Li | G01S 17/931 |
| 2020/0033459 | A1* | 1/2020 | Hattass | G01S 7/481 |
| 2021/0181547 | A1* | 6/2021 | Cordeiro | G02F 1/0121 |
| 2022/0146680 | A1* | 5/2022 | Donovan | G01S 17/89 |
| 2022/0390280 | A1* | 12/2022 | Pavanello | G01J 3/0259 |

FOREIGN PATENT DOCUMENTS

| CN | 102089651 A | 6/2011 |
| CN | 109073757 A | 12/2018 |
| CN | 110199182 A | 9/2019 |

OTHER PUBLICATIONS

Chinese Office Action for Chinese Application No. 202111524457.9 dated Feb. 26, 2025.

\* cited by examiner

*Primary Examiner* — Luke D Ratcliffe (57) ABSTRACT

A sensor diagnostic system includes a first sensor configured to receive a reflected signal that corresponds to a portion of a transmitted signal transmitted from a second sensor and reflected from a surface, a wavelength determination module configured to determine a first wavelength of the reflected signal that is indicative of a second wavelength of the transmitted signal, a wavelength shift detection module configured to determine a shift in at least one of the first wavelength and the second wavelength, and a sensor health analysis module configured to perform diagnostics on the second sensor based on the determined shift.

20 Claims, 4 Drawing Sheets

LIDAR LASER HEALTH DIAGNOSTIC

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to systems and methods for performing diagnostics on autonomous driving sensors.

Vehicles include one or more torque producing devices, such as an internal combustion engine and/or an electric motor. A passenger of a vehicle rides within a passenger cabin (or passenger compartment) of the vehicle.

Autonomous driving systems drive a vehicle completely independent of a human driver. For example, autonomous driving systems control the acceleration, brake, and steering systems of a vehicle independent of a driver.

Semiautonomous driving systems drive a vehicle partially independent of a human driver. For example, a semiautonomous driving system may control the steering system independent of a driver while relying on the driver to set a target speed for the semiautonomous driving system to achieve by controlling the acceleration and brake systems.

SUMMARY

A sensor diagnostic system includes a first sensor configured to receive a reflected signal that corresponds to a portion of a transmitted signal transmitted from a second sensor and reflected from a surface, a wavelength determination module configured to determine a first wavelength of the reflected signal that is indicative of a second wavelength of the transmitted signal, a wavelength shift detection module configured to determine a shift in at least one of the first wavelength and the second wavelength, and a sensor health analysis module configured to perform diagnostics on the second sensor based on the determined shift.

In other features, the second sensor is a light detection and ranging (LIDAR) sensor.

In other features, the sensor health analysis module is configured to determine a change in at least one operating characteristic of the LIDAR sensor based on the determined shift and perform the diagnostics on the LIDAR sensor based on the determined change in the at least one operating characteristic.

In other features, the at least one operating characteristic includes at least one of a die temperature, mode hopping, optical cavity stability, photon energy, pulse width, power and beam intensity, a shift in magnitude, a shift in phase, a shift in polarization.

In other features, the sensor health analysis module is configured to determine the change in the at least one operating characteristic of the LIDAR sensor based on a lookup table correlating the determined shift with the change in the at least one operating characteristic.

In other features, the sensor health analysis module is configured to perform the diagnostics of the LIDAR sensor based on a comparison between the change in the at least one operating characteristic and a threshold.

In other features, an autonomous module is configured to selectively control functions of a vehicle and, based on the diagnostics, one of discontinue controlling functions of the vehicle, disable the LIDAR sensor, and activate an indicator.

In other features, the wavelength shift detection module is configured to determine the shift based on a comparison between the at least one of the first wavelength and the second wavelength and a reference wavelength.

In other features, at least one of a spectrometer and a spectroradiometer is configured to determine the first wavelength of the reflected signal.

In other features, the sensor diagnostic system includes a liquid crystal metasurface.

In other features, the first sensor and the second sensor are arranged in a passenger cabin of a vehicle.

In other features, the first sensor and the second sensor are arranged within a same housing.

In other features, the first sensor and the second sensor are arranged in a passenger cabin of the vehicle.

A sensor diagnostic system for a vehicle includes a light detection and ranging (LIDAR) sensor that includes a transmitting portion and a receiving portion. The transmitting portion is configured to transmit a signal and the receiving portion is configured to receive, as a received signal, a first portion of the transmitted signal that is reflected from an object in an environment external to the vehicle. A reflected signal sensor is positioned to receive a reflected signal corresponding to a second portion of the transmitted signal that is reflected from a surface of vehicle. A sensor diagnostic module is configured to determine a first wavelength of the reflected signal, wherein the first wavelength is indicative of a second wavelength of the transmitted signal, determine a shift in at least one of the first wavelength and the second wavelength, and perform diagnostics on the LIDAR sensor based on the determined shift.

In other features, the sensor diagnostic module is configured to determine a change in at least one operating characteristic of the LIDAR sensor based on the determined shift and perform the diagnostics on the LIDAR sensor based on the determined change in the at least one operating characteristic.

In other features, the at least one operating characteristic includes at least one of a die temperature, mode hopping, optical cavity stability, photon energy, pulse width, power and beam intensity, a shift in magnitude, a shift in phase, a shift in polarization.

In other features, the sensor diagnostic module is configured to perform the diagnostics of the LIDAR sensor based on a comparison between the change in the at least one operating characteristic and a threshold.

In other features, an autonomous module is configured to selectively control functions of a vehicle and, based on the diagnostics, one of discontinue controlling functions of the vehicle, disable the LIDAR sensor, and activate an indicator.

In other features, the sensor diagnostic module is configured to determine the shift based on a comparison between the at least one of the first wavelength and the second wavelength and a reference wavelength.

A method of diagnosing a light detection and ranging (LIDAR) sensor of a vehicle includes transmitting a signal, from the LIDAR sensor, from a passenger cabin of the vehicle, receiving, as a received signal, a first portion of the transmitted signal that passes through a windshield of the vehicle and is reflected from an object in an environment external to the passenger cabin, receiving, using a reflected signal sensor arranged within the passenger cabin of the vehicle, a reflected signal corresponding to a second portion of the transmitted signal that is reflected from an interior surface within the passenger cabin without passing through the windshield, determining a first wavelength of the reflected signal that is indicative of a second wavelength of the transmitted signal, determining a shift in at least one of the first wavelength and the second wavelength, and performing diagnostics on the LIDAR sensor based on the determined shift.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle may include one or more cameras and/or one or more sensors (i.e., combination transmitter/sensors) used for autonomous driving. For example, the sensors may include one or more light detection and ranging (LIDAR) sensors. Systems and methods according to the present disclosure are configured to perform diagnostics (e.g., an assessment of health/functionality) on the sensors. In one example, a sensor diagnostic module detects a wavelength shift of a laser transmitted and received by the sensor and diagnoses the sensor based on the wavelength shift. Various mechanisms may be implemented to measure or estimate the wavelength shift including, but not limited to, a spectrometer, a spectroradiometer, a metasurface (e.g. a liquid crystal (LC) metasurface) arranged to receive/reflect the laser, a prism, mirror, and/or Bragg grating element, etc. Although described with respect to vehicle implementations, the principles of the present disclosure may also be applied to non-vehicle implementations or implemented within any LASER module.

Figure 1:
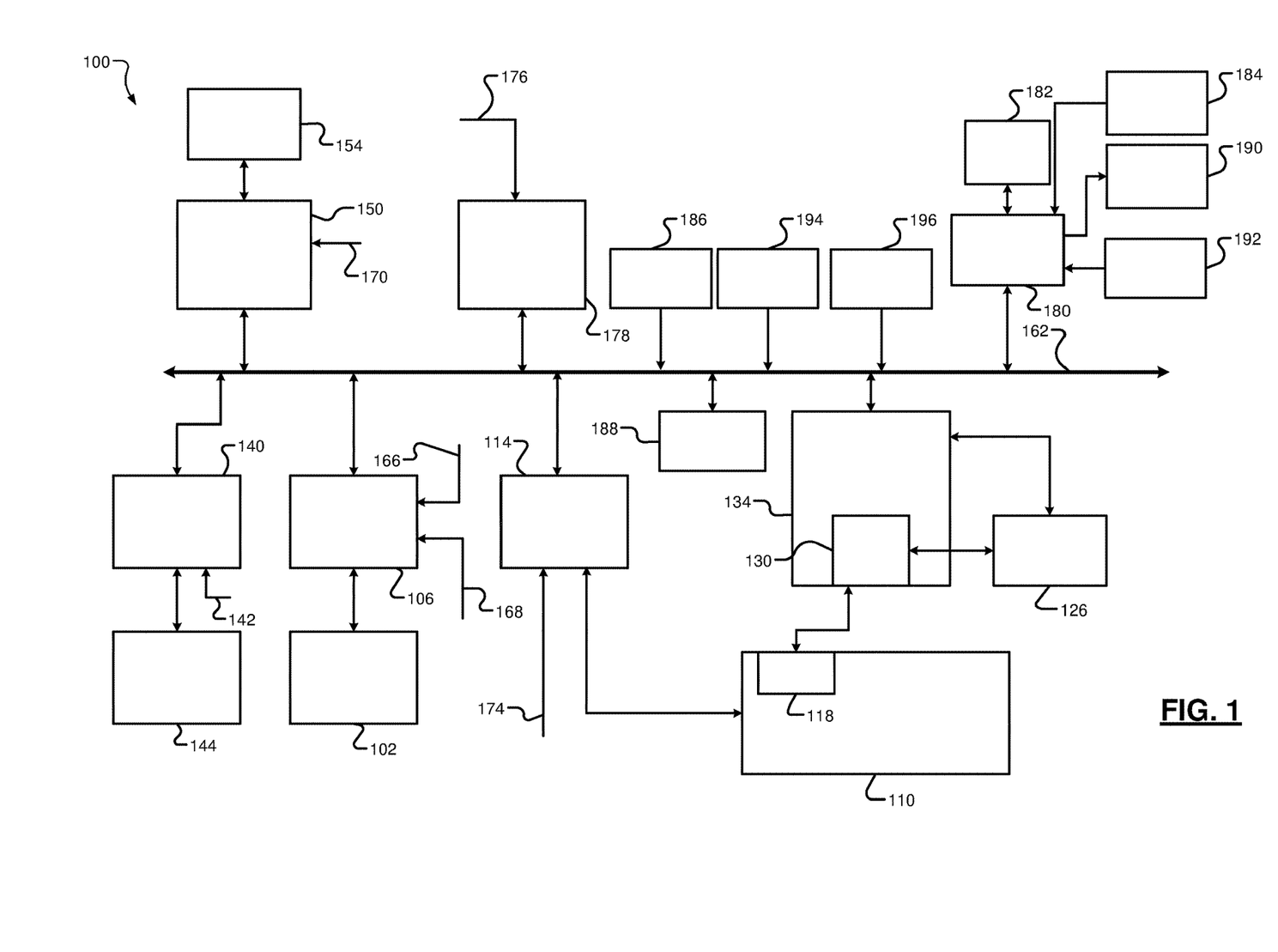
FIG. 1 is a functional block diagram of an example vehicle system.

Referring now to FIG. 1, a functional block diagram of an example vehicle system 100 is presented. While a vehicle system for a hybrid vehicle is shown and will be described, the present disclosure is also applicable to non-hybrid vehicles, electric vehicles, fuel cell vehicles, and other types of vehicles.

An engine 102 may combust an air/fuel mixture to generate drive torque. An engine control module (ECM) 106 controls the engine 102. For example, the ECM 106 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators.

The engine 102 may output torque to a transmission 110. A transmission control module (TCM) 114 controls operation of the transmission 110. For example, the TCM 114 may control gear selection within the transmission 110 and one or more torque transfer devices (e.g., a torque converter, one or more clutches, etc.).

The vehicle system may include one or more electric motors. For example, an electric motor 118 may be implemented within the transmission 110 as shown in the example of FIG. 1. An electric motor can act as either a generator or as a motor at a given time. When acting as a generator, an electric motor converts mechanical energy into electrical energy. The electrical energy can be, for example, used to charge a battery 126 via a power control device (PCD) 130. When acting as a motor, an electric motor generates torque that may be used, for example, to supplement or replace torque output by the engine 102. While the example of one electric motor is provided, the vehicle may include zero or more than one electric motor.

A power inverter module (PIM) 134 may control the electric motor 118 and the PCD 130. The PCD 130 applies (e.g., direct current) power from the battery 126 to the (e.g., alternating current) electric motor 118 based on signals from the PIM 134, and the PCD 130 provides power output by the electric motor 118, for example, to the battery 126. The PIM 134 may be referred to as an inverter module in various implementations.

A steering control module 140 controls steering/turning of wheels of the vehicle, for example, based on driver turning of a steering wheel within the vehicle and/or steering commands from one or more vehicle control modules. A steering wheel angle sensor (SWA) monitors rotational position of the steering wheel and generates a SWA 142 based on the position of the steering wheel. As an example, the steering control module 140 may control vehicle steering via an EPS motor 144 based on the SWA 142. However, the vehicle may include another type of steering system.

An electronic brake control module (EBCM) 150 may selectively control brakes 154 of the vehicle. Modules of the vehicle may share parameters via a controller area network (CAN) 162. The CAN 162 may also be referred to as a car area network. For example, the CAN 162 may include one or more data buses. Various parameters may be made available by a given control module to other control modules via the CAN 162.

The driver inputs may include, for example, an accelerator pedal position (APP) 166 which may be provided to the ECM 106. A cruise control input 168 may also be input to the ECM 106 from a cruise control system. In various implementations, the cruise control system may include an adaptive cruise control system. A brake pedal position (BPP) 170 may be provided to the EBCM 150. A position 174 of a park, reverse, neutral, drive lever (PRNDL) may be provided to the TCM 114. An ignition state 176 may be provided to a body control module (BCM) 178. For example, the ignition state 176 may be input by a driver via an ignition key, button, or switch. At a given time, the ignition state 176 may be one of off, accessory, run, or crank.

The vehicle system may include an infotainment module 180. The infotainment module 180 controls what is displayed on a display 182. The display 182 may be a touchscreen display in various implementations and transmit signals indicative of user input to the display 182 to the infotainment module 180. The infotainment module 180 may additionally or alternatively receive signals indicative of user input from one or more other user input devices 184, such as one or more switches, buttons, knobs, etc.

The infotainment module 180 may receive input from a plurality of external sensors and cameras, generally illustrated in FIG. 1 by 186. For example, the infotainment module 180 may display video, various views, and/or alerts on the display 182 via input from the external sensors and cameras 186. The external sensors and cameras 186 may include sensors (e.g., LIDAR sensors) that capture images and video outside of (external to) the vehicle and various types of sensors measuring parameters outside of (external to) the vehicle. Input from the external sensors and cameras 186 may be used to control autonomous driving.

For example, an autonomous module 188 may be configured to control steering, acceleration and deceleration, and braking of the vehicle during autonomous driving of the vehicle. For example, the autonomous module 188 may detect features and objects around the vehicle based on input from the external cameras and sensors 186 and control steering, acceleration, and deceleration based on the features and objects, such as to avoid any objects detected. During autonomous driving, however, driver inputs (e.g., steering, braking, and/or acceleration inputs) may override input from the autonomous module 188. The autonomous module 188 (and/or another module, such as the ECM 106) according to the present disclosure implements a sensor diagnostic module as described below in more detail.

The infotainment module 180 may also generate output via one or more other devices. For example, the infotainment module 180 may output sound via one or more speakers 190 of the vehicle. The vehicle may include one or more additional control modules that are not shown, such as a chassis control module, a battery pack control module, etc. The vehicle may omit one or more of the control modules shown and discussed.

A global positioning system (GPS) module 192 receives GPS data from a GPS system. A driver monitoring module 194 includes one or more devices configured to monitor one or more characteristics of a driver of the vehicle. For example, the driver monitoring module 194 may include one or more cameras configured to capture images of the driver and within a passenger cabin of the vehicle, for example, to determine a facial expression, one or more gestures, hand placement, and other driver information based on the images.

A V2X module 196 communicates with other vehicles via a vehicle to vehicle (V2V) communication protocol and/or with infrastructure via a vehicle to infrastructure (V2I) communication protocol. V2V communication and V2I communication can be more generally referred to as V2X communication.

Figure 2:
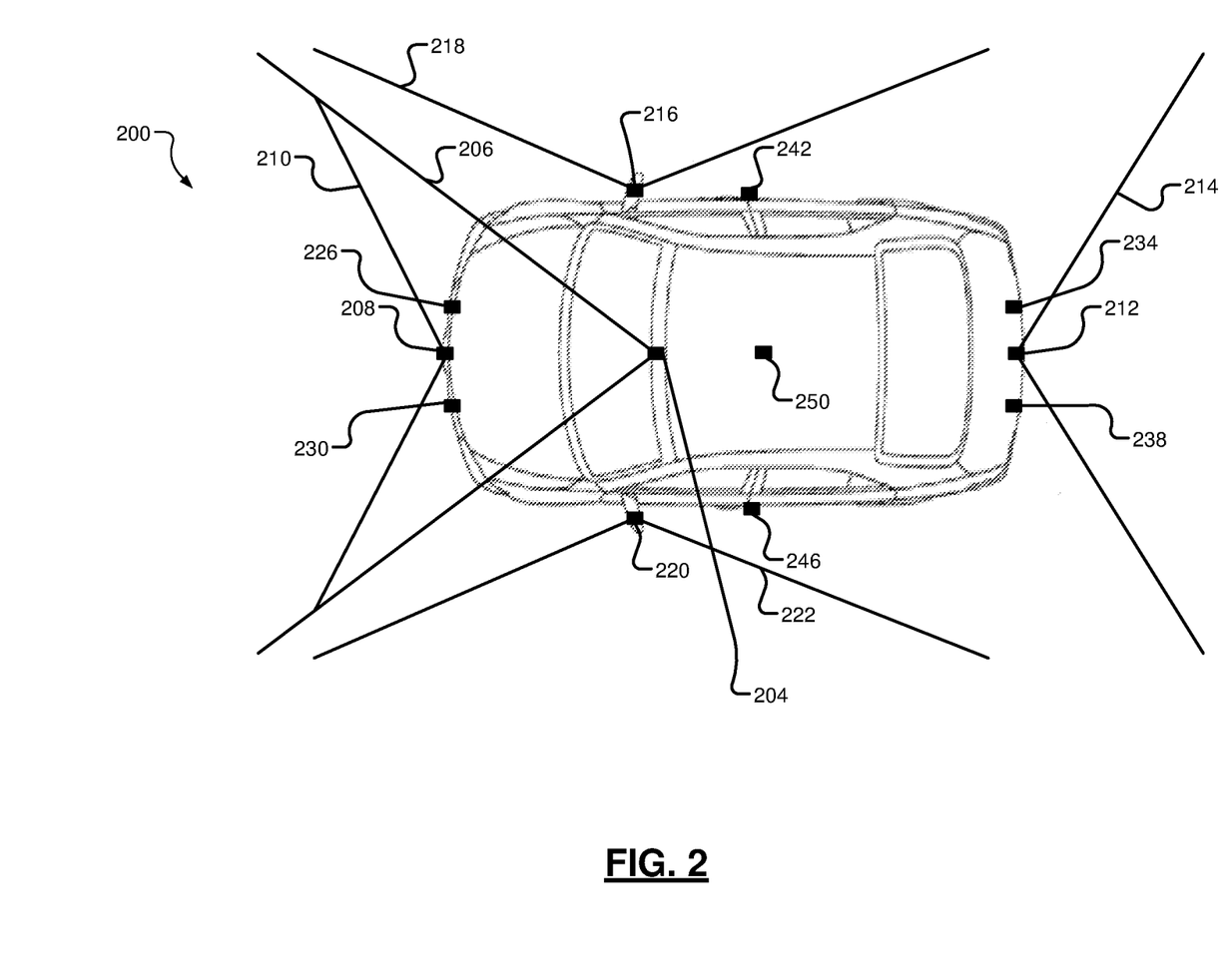
FIG. 2 is a functional block diagram of a vehicle including examples of external sensors and cameras.

Referring now to FIG. 2, a functional block diagram of a vehicle 200 including examples of external sensors and cameras (e.g., the external sensors and cameras 186 as described in FIG. 1) is presented. The external sensors and cameras 186 include various cameras positioned to capture images and video outside of (external to) the vehicle 200 and various types of sensors measuring parameters outside of (external to) the vehicle 200. For example, a forward facing camera 204 captures images and video of images within a predetermined field of view (FOV) 206 in front of the vehicle 200.

A front camera 208 may also capture images and video within a predetermined FOV 210 in front of the vehicle 200. The front camera 208 may capture images and video within a predetermined distance of the front of the vehicle 200 and may be located at the front of the vehicle 200 (e.g., in a front fascia, grille, or bumper). The forward facing camera 204 may be located more rearward, such as with a rear view mirror within a windshield of the vehicle 200. The forward facing camera 204 may not be able to capture images and video of items within all of or at least a portion of the predetermined FOV of the front camera 208 and may capture images and video that is greater than the predetermined distance of the front of the vehicle 200. In various implementations, only one of the forward facing camera 204 and the front camera 208 may be included.

A rear camera 212 captures images and video within a predetermined FOV 214 behind the vehicle 200. The rear camera 212 may capture images and video within a predetermined distance behind the vehicle 200 and may be located at the rear of the vehicle 200, such as near a rear license plate. A right camera 216 captures images and video within a predetermined FOV 218 to the right of the vehicle 200. The right camera 216 may capture images and video within a predetermined distance to the right of the vehicle 200 and may be located, for example, under a right side rear view mirror. In various implementations, the right side rear view mirror may be omitted, and the right camera 216 may be located near where the right side rear view mirror would normally be located. A left camera 220 captures images and video within a predetermined FOV 222 to the left of the vehicle 200. The left camera 220 may capture images and video within a predetermined distance to the left of the vehicle 200 and may be located, for example, under a left side rear view mirror. In various implementations, the left side rear view mirror may be omitted, and the left camera 220 may be located near where the left side rear view mirror would normally be located. While the example FOVs are shown for illustrative purposes, the FOVs may overlap, for example, for more accurate and/or inclusive stitching.

The external sensors and cameras 186 also include various other types of sensors, such as radar sensors, one or more LIDAR sensors 250, etc. For example, the vehicle 200 may include one or more forward facing radar sensors, such as forward facing radar sensors 226 and 230, one or more rearward facing radar sensors, such as rearward facing radar sensors 234 and 238. The vehicle 200 may also include one or more right side radar sensors, such as right side radar sensor 242, and one or more left side radar sensors, such as left side radar sensor 246. The locations and fields of view of the cameras and radar sensors are provided as examples only and different locations and fields of view could be used. Radar sensors output radar signals around the vehicle 200. Objects around the vehicle 200 can be detected based on input from the external sensors and cameras 186.

One or more sensors may be located rearward of the windshield (e.g., within the passenger cabin of the vehicle 200, such as the forward facing camera 204 as described above). In some examples, a LIDAR sensor including a LIDAR transmitter and sensor is located within the passenger cabin. Accordingly, a signal transmitted from the LIDAR sensor passes through the windshield, reflects off of objects in the environment external to the vehicle, and passes back through the windshield to be received by the LIDAR sensor. A portion of the transmitted signal is reflected from an interior surface of the windshield back into the passenger cabin. The sensor diagnostic module according to the present disclosure is configured to perform diagnostics on the transmitter of the LIDAR sensor based on the reflected signal as described below in more detail.

Figure 3:
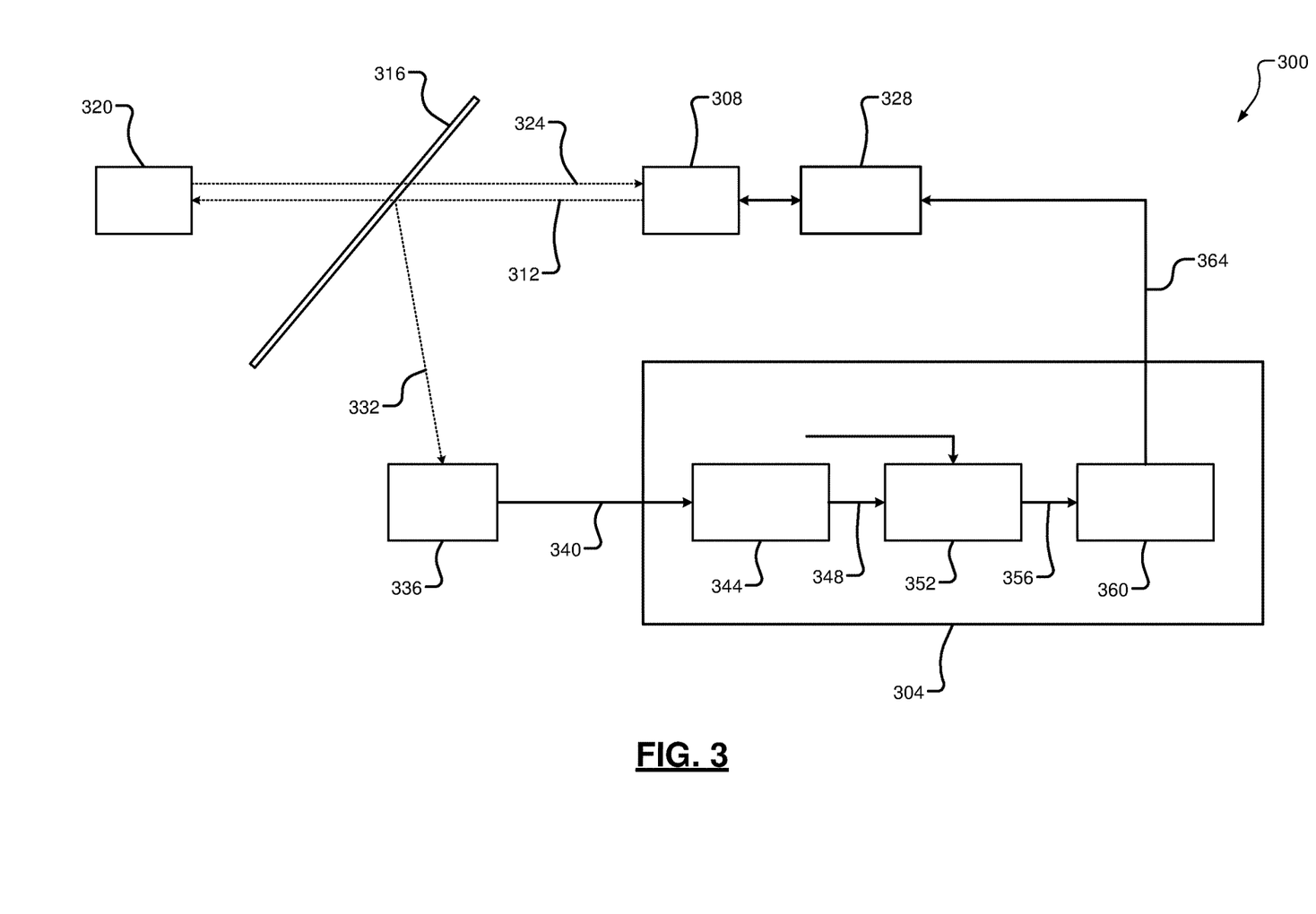
FIG. 3 is a functional block diagram of an example sensor diagnostic system including a sensor diagnostic module.

Referring now to FIG. 3, an example sensor diagnostic system 300 according to the present disclosure includes a sensor diagnostic module 304. The sensor diagnostic module 304 is configured to perform diagnostics on a sensor (e.g., a LIDAR sensor) 308. The sensor 308 is configured to transmit a signal (e.g., a laser signal) 312 from within an interior of a vehicle (e.g., the vehicle 200) through a windshield 316 of the vehicle 200. For example, the sensor 308 is arranged in a passenger cabin of the vehicle 200, such as on a ceiling of the passenger cabin, on or adjacent to a rearview mirror, on a dashboard, etc.

The signal 312 passes through the windshield 316 and is reflected from an object 320 in an environment around the vehicle 200 and is received by the sensor 308 as a received signal 324. An autonomous module 328 may detect features and objects in the environment around the vehicle 200 based on input from the sensor 308. For example, the received signal 324 indicates a distance between the vehicle 200 and the object 320 and the autonomous module 328 controls functions of the vehicle 200 accordingly as described above in more detail.

A portion of the signal 312 is reflected off of an interior surface of the windshield 316 (as a reflected signal 332) back into the interior of the vehicle 200. One or more reflected signal sensors or receivers 336 are positioned to receive the reflected signal 332. For example, the reflected signal sensor 336 is arranged in the passenger cabin of the vehicle 200 in a location corresponding to a known or predetermined trajectory of the reflected signal 332, such as on a ceiling of the passenger cabin, on or adjacent to the rearview mirror, on the dashboard, etc. In some examples, the reflected signal sensor 336 is located adjacent to or integrated within the sensor 308 (e.g., integrated within a same housing as the sensor 308). The trajectory of the reflected signal 332 may be dependent upon the rake or angle of the windshield 316, a material composition of the windshield 315, etc. Accordingly, the trajectory of the reflected signal 332 and the location of the reflected signal sensor 336 may vary by vehicle. In some examples, the windshield 316 may include an embedded or attached reflecting module (not shown) positioned to receive and reflect the signal 312 at a predetermined trajectory (i.e., toward a desired position of the reflected signal sensor 336).

In some examples, a liquid crystal metasurface may be arranged to receive the signal 312 or the reflected signal 332. For example, the liquid crystal metasurface may be arranged adjacent to or embedded within the windshield 316 and may be configured to receive the signal 312 and steer one or more of the reflected signals 332 in a desired direction. In other examples, the reflected signal sensor 336 may include a liquid crystal metasurface configured to receive the reflected signal 332. In still other examples, the liquid crystal metasurface may be arranged elsewhere within the passenger cabin, within the sensor 308, etc.

The sensor diagnostic module 304 is configured to perform diagnostics on the sensor 308 (e.g., a transmitter portion of the sensor 308) based on the reflected signal 332. For example, the sensor diagnostic module 304 receives an output 340 of the reflected signal sensor 336 indicative of characteristics of the reflected signal 332. The sensor diagnostic module 304 is configured to determine a wavelength of the reflected signal 332, which is indicative of a wavelength of the signal 312 transmitted from the sensor 308. The sensor diagnostic module 304 determines (diagnoses) a condition of the sensor 308 based on the determined wavelength of the reflected signal 332.

For example, the sensor diagnostic module 304 includes a wavelength determination module 344 configured to determine the wavelength of the reflected signal 332 and, correspondingly, the wavelength of the signal 312 based on the output 340 of the reflected signal sensor 336. For example, the reflected signal sensor 336 and the wavelength determination module 344 may correspond to components of a chip-scale spectrometer configured to receive the reflected signal 332, measure the wavelength of the reflected signal 332, and output a wavelength signal 348 indicating the measured wavelength. In another example, the reflected signal sensor 336 and/or the wavelength determination module 344 may include components including, but not limited to, a prism, a Bragg deflector or grating element, a beam combiner, fiber optic cables and couplings, etc. configured to receive the reflected signal 332, measure the wavelength of the reflected signal 332, and output the wavelength signal 348.

In one example, the wavelength signal 348 may correspond to the wavelength of the reflected signal 332. In another example, the wavelength determination module 344 determines the wavelength of the signal 312 based on the measured wavelength of the reflected signal 332 and the wavelength signal 348 corresponds to the wavelength of the signal 312.

A wavelength shift detection module 352 receives the wavelength signal 348 and calculates a wavelength shift based on changes in the wavelength signal 348. For example, the wavelength shift detection module 352 is configured to compare the wavelength signal 348 with a reference wavelength. The reference wavelength may correspond to a wavelength of the transmitted signal 312 during normal operation. The reference wavelength may be determined during manufacture, measured during calibration of the sensor 308, determined over time during an operation period of the sensor 308, etc. The wavelength shift detection module 352 outputs a wavelength shift signal 356 indicative of the calculated wavelength shift.

A sensor health analysis module 360 receives the wavelength shift signal 356 and is configured to perform diagnostics on the sensor 308 based on the wavelength shift signal 356. The wavelength of the signal 312 (and, correspondingly, the wavelength shift indicated by the wavelength shift signal 356) is indicative of various operating characteristics of the sensor 308, which may be further indicative of the health of the sensor 308.

For example, the wavelength of the signal 312 may indicate operating characteristics of the sensor 308 including, but not limited to, a die temperature of the sensor 308, mode hopping, optical cavity stability, photon energy, pulse width, power and beam intensity, and shifts in magnitude, phase, and/or polarization. In other words, the wavelength shift indicates a corresponding change in respective operating characteristics of the sensor 308. Respective relationships between the wavelength shift and the changes in the operating characteristics of the sensor 308 may vary by laser type and in accordance with other operating or environmental characteristics (e.g., temperature). For example, die temperature may have a generally linear or piecewise linear relationship with the wavelength of the signal 312. For example only, the sensor health analysis module 360 may determine the changes in the operating characteristics of the sensor 308 using a lookup table that correlates wavelength shift to changes in the respective operating characteristics, respective formulas or algorithms that use wavelength shift as an input to calculate the operating characteristics, models, etc.

The sensor health analysis module 360 is configured to selectively command and/or perform one or more remedial actions based on the wavelength shift and corresponding changes to the operating characteristics. For example, the sensor health analysis module 360 outputs a diagnostic result signal 364 requesting one or more remedial actions. For example only, the diagnostic result signal 364 may indicate that the wavelength shift and/or changes in one or more of the operating characteristics of the sensor 308 exceeds a respective threshold.

In some examples, the sensor health analysis module 360 may be configured to predict degradation and/or a remaining lifetime of the sensor 308. For example, as the wavelength shift varies or increases over time, the sensor health analysis module 360 may predict (e.g., based on a rate of change of the wavelength) when the wavelength shift will reach a threshold indicating that the sensor 308 is no longer reliable.

The autonomous module 328 may receive the diagnostic result signal 364 and selectively perform remedial actions based on the diagnostic result signal 364. The remedial actions include, but are not limited to, activating an indicator to inform a driver of the health of the sensor 308 (e.g., activing a check engine or other diagnostic light, displaying information on a display screen, etc.), deactivating the sensor 308, disregarding inputs received from the sensor 308, disabling autonomous driving functions, etc.

Figure 4:
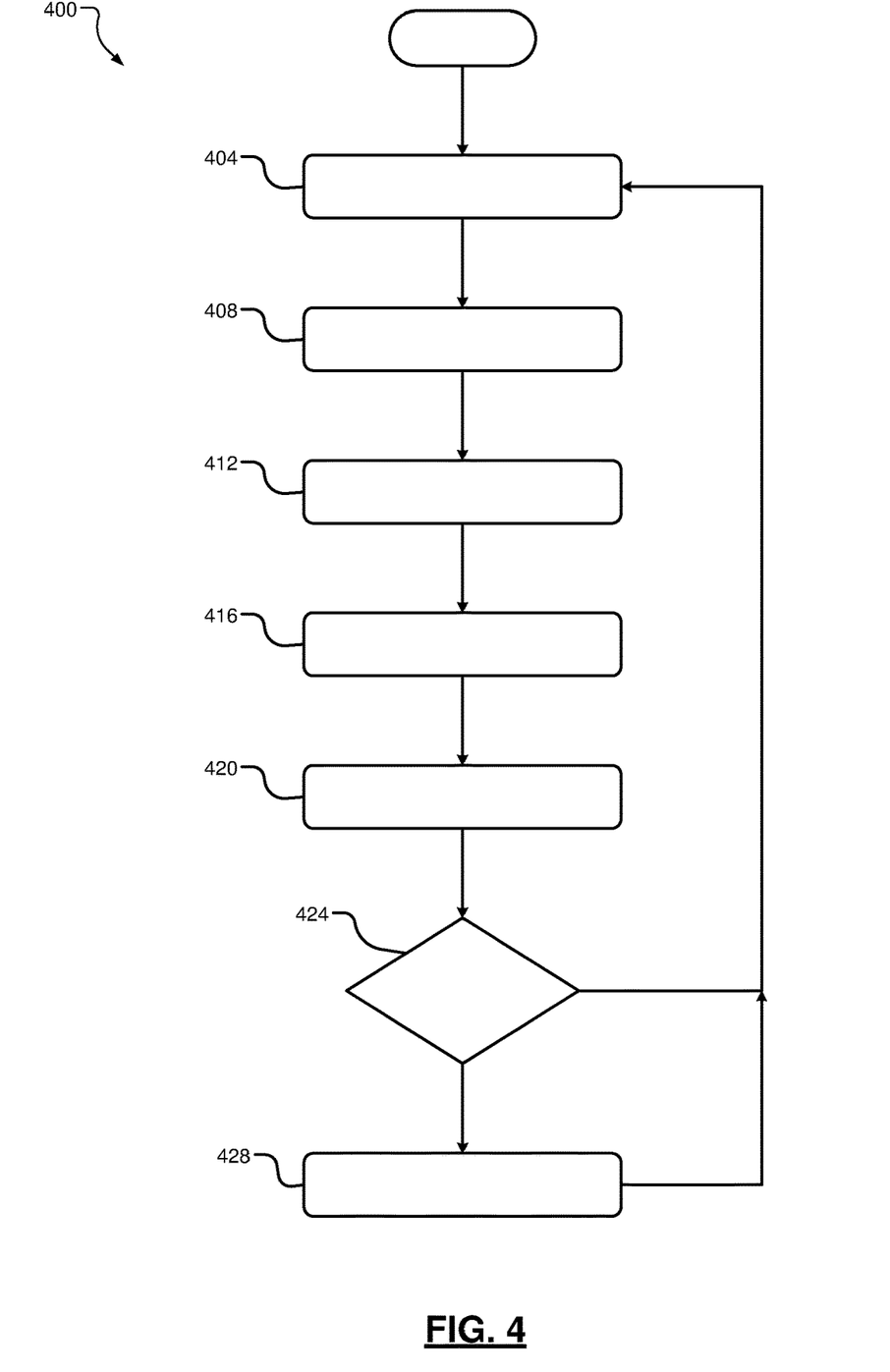
FIG. 4 illustrate steps of an example method of performing diagnostics on a sensor.

FIG. 4 is an example method 400 of performing diagnostics on a sensor 308 according to the principles of the present disclosure. At 404, the method 400 transmits a signal from a sensor (e.g., transmits a laser from a LIDAR sensor, such as the signal 312 transmitted from the sensor 308). At 408, the method 400 (e.g., the reflected signal sensor 336) receives a portion of the signal reflected from a surface, such as an interior surface of the windshield 316. At 412, the method 400 (e.g., respective components of the reflected signal sensor 336 and/or the wavelength determination module 344) determines and outputs a wavelength of the reflected signal and/or the wavelength of the transmitted signal.

At 416, the method 400 (e.g., the wavelength shift detection module 352) determines and outputs a wavelength shift of the reflected signal and/or the transmitted signal. At 420, the method 400 (e.g., the sensor health analysis module 360) performs diagnostics on the sensor 308 based on the wavelength shift. For example, the sensor health analysis module 360 determines changes in operating characteristics of the sensor 308 based on the wavelength shift and performs the diagnostics based on the changes in the operating characteristics.

At 424, the method 400 (e.g., the sensor health analysis module 260, the autonomous module 328, etc.) determines whether to perform one or more remedial actions based on the diagnostics. For example, the method 400 determines whether one or more of the wavelength shift and the operating characteristics exceeds a respective threshold indicative of degraded performance (e.g., inaccurate sensing results). If true, the method 400 continues to 428. If false, the method 400 continues to 404.

At 428, the method 400 (e.g., the sensor health analysis module 260, the autonomous module 328, etc.) selectively performs one or more remedial actions based on the diagnostics. The method 400 then continues to 404. Accordingly, the method 400 may continuously (or, in some examples, periodically, conditionally, etc.) monitor the reflected signal 332 to diagnose the health of the sensor 308.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A sensor diagnostic system, comprising:
a first sensor configured to receive a reflected signal, wherein the reflected signal corresponds to a portion of a transmitted signal transmitted from a second sensor and reflected from a surface;
a wavelength determination module configured to determine a first wavelength of the reflected signal, wherein the first wavelength is indicative of a second wavelength of the transmitted signal;
a wavelength shift detection module configured to determine a shift in at least one of the first wavelength and the second wavelength; and
a sensor health analysis module configured to perform diagnostics on the second sensor based on the determined shift,
wherein the second sensor is a light detection and ranging (LIDAR) sensor,
wherein the sensor health analysis module is configured to determine a change in at least one operating characteristic of the LIDAR sensor based on the determined shift and perform the diagnostics on the LIDAR sensor based on the determined change in the at least one operating characteristic, and
wherein the operating characteristic is one of die temperature, mode hopping, and optical cavity stability.

2. The sensor diagnostic system of claim 1, wherein the at least one operating characteristic includes die temperature.

3. The sensor diagnostic system of claim 1, wherein the sensor health analysis module is configured to determine the change in the at least one operating characteristic of the LIDAR sensor based on a lookup table correlating the determined shift with the change in the at least one operating characteristic.

4. The sensor diagnostic system of claim 1, wherein the sensor health analysis module is configured to perform the diagnostics of the LIDAR sensor based on a comparison between the change in the at least one operating characteristic and a threshold.

5. The sensor diagnostic system of claim 1, further comprising an autonomous module configured to (i) selectively control functions of a vehicle and (ii) based on the diagnostics, one of discontinue controlling functions of the vehicle, disable the LIDAR sensor, and activate an indicator.

6. The sensor diagnostic system of claim 1, wherein the wavelength shift detection module is configured to determine the shift based on a comparison between (i) the at least one of the first wavelength and the second wavelength and (ii) a reference wavelength.

7. The sensor diagnostic system of claim 1, further comprising at least one of a spectrometer and a spectroradiometer configured to determine the first wavelength of the reflected signal.

8. The sensor diagnostic system of claim 1, further comprising a liquid crystal metasurface.

9. The sensor diagnostic system of claim 1, wherein the first sensor and the second sensor are arranged in a passenger cabin of a vehicle.

10. The sensor diagnostic system of claim 1, wherein the first sensor and the second sensor are arranged within a same housing.

11. A vehicle comprising the sensor diagnostic system of claim 1, wherein the first sensor and the second sensor are arranged in a passenger cabin of the vehicle.

12. The sensor diagnostic system of claim 1, wherein the at least one operating characteristic includes mode hopping.

13. The sensor diagnostic system of claim 1, wherein the at least one operating characteristic includes optical cavity stability.

14. A sensor diagnostic system for a vehicle, the sensor diagnostic system comprising:

a light detection and ranging (LIDAR) sensor, wherein the LIDAR sensor includes a transmitting portion and a receiving portion, wherein the transmitting portion is configured to transmit a signal, and wherein the receiving portion is configured to receive, as a received signal, a first portion of the transmitted signal that is reflected from an object in an environment external to the vehicle;

a reflected signal sensor positioned to receive a reflected signal corresponding to a second portion of the transmitted signal that is reflected from a surface of vehicle; and a sensor diagnostic module configured to (i) determine a first wavelength of the reflected signal, wherein the first wavelength is indicative of a second wavelength of the transmitted signal, (ii) determine a shift in at least one of the first wavelength and the second wavelength, and (iii) perform diagnostics on the LIDAR sensor based on the determined shift, wherein the sensor diagnostic module is configured to determine a change in at least one operating characteristic of the LIDAR sensor based on the determined shift and perform the diagnostics on the LIDAR sensor based on the determined change in the at least one operating characteristic, and wherein the operating characteristic is one of die temperature, mode hopping, and optical cavity stability.

15. The sensor diagnostic system of claim 14, wherein the sensor diagnostic module is configured to perform the diagnostics of the LIDAR sensor based on a comparison between the change in the at least one operating characteristic and a threshold.

16. The sensor diagnostic system of claim 14, further comprising an autonomous module configured to (i) selectively control functions of a vehicle and (ii) based on the diagnostics, one of discontinue controlling functions of the vehicle, disable the LIDAR sensor, and activate an indicator.

17. The sensor diagnostic system of claim 14, wherein the sensor diagnostic module is configured to determine the shift based on a comparison between (i) the at least one of the first wavelength and the second wavelength and (ii) a reference wavelength.

18. A method of diagnosing a light detection and ranging (LIDAR) sensor of a vehicle, the method comprising:

transmitting a signal, from the LIDAR sensor, from a passenger cabin of the vehicle;

receiving, as a received signal, a first portion of the transmitted signal that passes through a windshield of the vehicle and is reflected from an object in an environment external to the passenger cabin;

receiving, using a reflected signal sensor arranged within the passenger cabin of the vehicle, a reflected signal corresponding to a second portion of the transmitted signal that is reflected from an interior surface within the passenger cabin without passing through the windshield;

determining a first wavelength of the reflected signal, wherein the first wavelength is indicative of a second wavelength of the transmitted signal;

determining a shift in at least one of the first wavelength and the second wavelength;

performing diagnostics on the LIDAR sensor based on the determined shift; and determining a change in at least one operating characteristic of the LIDAR sensor based on the determined shift, wherein the performing the diagnostics includes performing the diagnostics on the LIDAR sensor based on the determined change in the at least one operating characteristic, and wherein the operating characteristic is one of die temperature, mode hopping, and optical cavity stability.

19. The method of claim 18, wherein the at least one operating characteristic includes mode hopping.

20. The method of claim 18, wherein the at least one operating characteristic includes optical cavity stability.

* * * * *